United States Patent
Addink et al.

(10) Patent No.: US 6,298,285 B1
(45) Date of Patent: Oct. 2, 2001

(54) IRRIGATION ACCUMULATION CONTROLLER

(75) Inventors: John Addink, Riverside; Kirk Buhler, Corona; Tony Varga, Irvine, all of CA (US)

(73) Assignee: Aqua Conservation Systems, Inc., Riverside, CA (US)

( * ) Notice: Subject to any disclaimer, the term of this patent is extended or adjusted under 35 U.S.C. 154(b) by 0 days.

(21) Appl. No.: 09/478,108

(22) Filed: Jan. 4, 2000

(51) Int. Cl.$^7$ ................ G05D 7/06; A01G 25/16
(52) U.S. Cl. ................ 700/284; 239/63; 239/69
(58) Field of Search ................ 700/284; 239/63, 239/64, 67, 69

(56) References Cited

U.S. PATENT DOCUMENTS

| | | | |
|---|---|---|---|
| 5,229,937 | * 7/1993 | Evelyn-Veere | 700/284 |
| 5,479,339 | * 12/1995 | Miller | 700/16 |
| 5,696,671 | 12/1997 | Oliver | 700/284 |
| 5,839,660 | * 11/1998 | Morgenstern et al. | 239/63 |
| 5,853,122 | * 12/1998 | Caprio | 239/44 C |
| 5,870,302 | 2/1999 | Oliver | 700/11 |

* cited by examiner

*Primary Examiner*—William Grant
*Assistant Examiner*—Paul Rodriguez
(74) *Attorney, Agent, or Firm*—Robert D. Fish; Fish & Associates, LLP

(57) ABSTRACT

An irrigation controller that is capable of making daily adjustment of irrigation duration based upon historical, environmental, and or received information. The irrigation controller can automatically skip days and make changes to account for daily and seasonal environmental changes. Such automatic determination is advantageous to minimize the need of the operator intervention to make seasonal change as well as providing irrigation savings, and ensures deep irrigation. The simplified user interface and control allows for a change made at any time of the year to effect the remainder of the year to provide the best balance of minimal or no user interface, irrigation conservation.

18 Claims, 4 Drawing Sheets

Rad (Radiation) = ETo x 1250
Ave Tmp (Average Temperature) = (ETo x 213) + 32
RH (Relative Humidity) = ETo x 71
Wind = ETo x 27

IRRIGATION ACCUMULATION CONTROLLER

FIELD OF THE INVENTION

The field of the invention is irrigation controllers.

BACKGROUND OF THE INVENTION

People often irrigate their lawns with automatic irrigation systems that operate on a fixed schedule, where the user sets the run time, minutes, and days for each station, and the controller provides the same irrigation run time(s) regardless of the season or weather. Such controllers require the user to make adjustments to the fixed schedule to account for seasonal variations. Some of these controllers incorporate sensors that can detect rain fall, and can suspend irrigation for one or several days, but ultimately the controller returns to the same fixed schedule entered by the user. Adjustment to the fixed schedule are made based upon the user's perception of the irrigation needs, which in turn can be based upon the appearance of the yard or other factors such as seasonal changes. While fixed schedule controllers satisfy the basic need of many user's by providing irrigation to each station, without adjustment for seasonal and daily variations the fixed schedule that is correct for one day might be either too much or too little irrigation for other days. An ideal irrigation controller should make adjustments to the irrigation run times to account for seasonal and/or daily environmental variations, as well as provide for automatic skipping of watering when it rains or when irrigation run times would be too short.

Some users make two or more fixed schedule changes each year. They usually make the first change in the spring when they notice a portion of the yard is becoming brown due to a lack of irrigation. The second change is often made in the fall when the user notices an excessive amount of irrigation. The changes made by the user can be entered by changing the days the system runs, or changing the duration (s) for each station. In general a reduction in the total irrigation time allows for a reduction in the irrigation being applied. While an increase in total irrigation time allows for an increase in the irrigation being applied. Numerous systems available today allow for a manual season adjustment where the user can increase or decrease the irrigation time for the stations by entering a single adjustment. Controllers with this feature however are still dependent upon human interaction to make the seasonal adjustment. This is potentially problematic because the average user may have insufficient knowledge to make an accurate adjustment, and the adjustments made for one day may not be accurate for another day. In addition, making changes to the seasonal adjustment does not allow the controller to skip days when the irrigation run time is too short to ensure deep irrigation.

Another popular method of altering irrigation in modern irrigation controllers incorporates a rain sensor shut off. When the sensor detects rain it makes the controller suspend irrigation until the rain has stopped. In other instances the rain shut off is manual, and often includes a rain delay button to allow for suspension of irrigation when rain is present or immanent. See U.S. Pat. Nos. 5,381,331 and 5,272,620. While this feature allows the user to suspend irrigation, it does not provide automatic suspension or adjustment for the rainy season.

More sophisticated controllers such as that disclosed in U.S. Pat. No. 4,646,224 automatically determine the number of cycles and length of time of that each irrigation is to be applied. However, such controllers require the operator to provide detailed data concerning desired sprinkling days, soil type, the type of sprinkler for each zone, and so forth. Moreover, while they allow for more accurate irrigation times, they are complicated to program, and do not automatically adjust for weather or seasonal variation.

Some controllers incorporate sensors that can detect moisture in the soil, suspend irrigation while the sensor detects moisture above a given threshold. Controllers of this type help to reduce over irrigating, but the placement of the sensor(s) are critical to correct irrigation. Another undesirable effect of using soil moisture controller's is that once they begin irrigation they will continue to irrigate for the same fixed duration.

Other controllers take measurements from numerous external sensors, such as humidity, precipitation, temperature, soil moisture, and wind to calculate the landscape irrigation use. These systems offer the best irrigation savings, but the cost and maintenance of the sensors can be extremely high.

Still other controllers incorporate pagers to receive an evapotranspiration (ETo) factor. The controllers of this type can receive multiple ETo factors for numerous zones. They use identifiers to determine the ETo information of their location and then calculate the run time for each station. Known controllers of this type have no sensors, but receive ETo input from a local or distal signal source. Disclosures of this type are U.S. Pat. No. 4,962,522, issued October 1990, and U.S. Pat. No. 5,208,855, issued May 1993, both to Marian, and each of which is incorporated by reference herein in its totality. The large quantity of data that can be received and interpreted makes ETo controllers complicated to use, and even systems touting automatic adjustment of irrigation flow still require relatively complicated input. Systems discussed in the U.S. Pat. No. 5,208,855, for example, receive the signal, and update an interval used for preset irrigation control timings rather than determine an entirely new irrigation schedule. Systems discussed in U.S. Pat. No. 5,444,611 to Woytowitz et al. (August, 1995) are said to automatically calculate and execute a new schedule, but the new schedule is based upon the season, and the ET value is from a weather station that may not be local to the controller.

The trend towards increasingly sophisticated controllers is accompanied by a trend towards simpler more intuitive user interface's with and little or no user intervention to account for weather or seasonal variation. Nevertheless, known controllers fall short of providing improved irrigation savings and minimizing the need for user interface, and the available options for user interface remain a relatively complex combination of buttons, dials and alphanumerical displays Summary of the Invention.

Methods and apparatus are provided herein that allow extremely simple user interface and control over sophisticated irrigation controller output. In one aspect of a particular class of embodiments, the operator enters the time, date, and the duration for each station. From that point on the controller uses historical information to determine the amount of irrigation to be applied each day. Such automatic scheduling determination may be further improved by use of a modem or other communication device that can provide local periodic ETo information. The automatic scheduling determination may be still further improved by use of one or more environmental sensors such as a temperature sensors or other measurement mechanism that can use the specific location information combined with or without geographic zone information to determine daily ETo irrigation requirements. In yet another aspect of the preferred embodiments, the owner may allow the controller to accumulate unapplied irrigation until a sufficient quantity has accumulated that will ensure deep irrigation. In yet another aspect of the preferred embodiments, the controller can provide feedback on irrigation savings. In yet another aspect of the preferred embodiments, the controller saves the current date in memory such that if a long-term loss of power occurs, seasonal error will be minimized. In yet another aspect of the preferred embodiments, the controller automatically accounts for additional ETo that occurs following irrigation.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
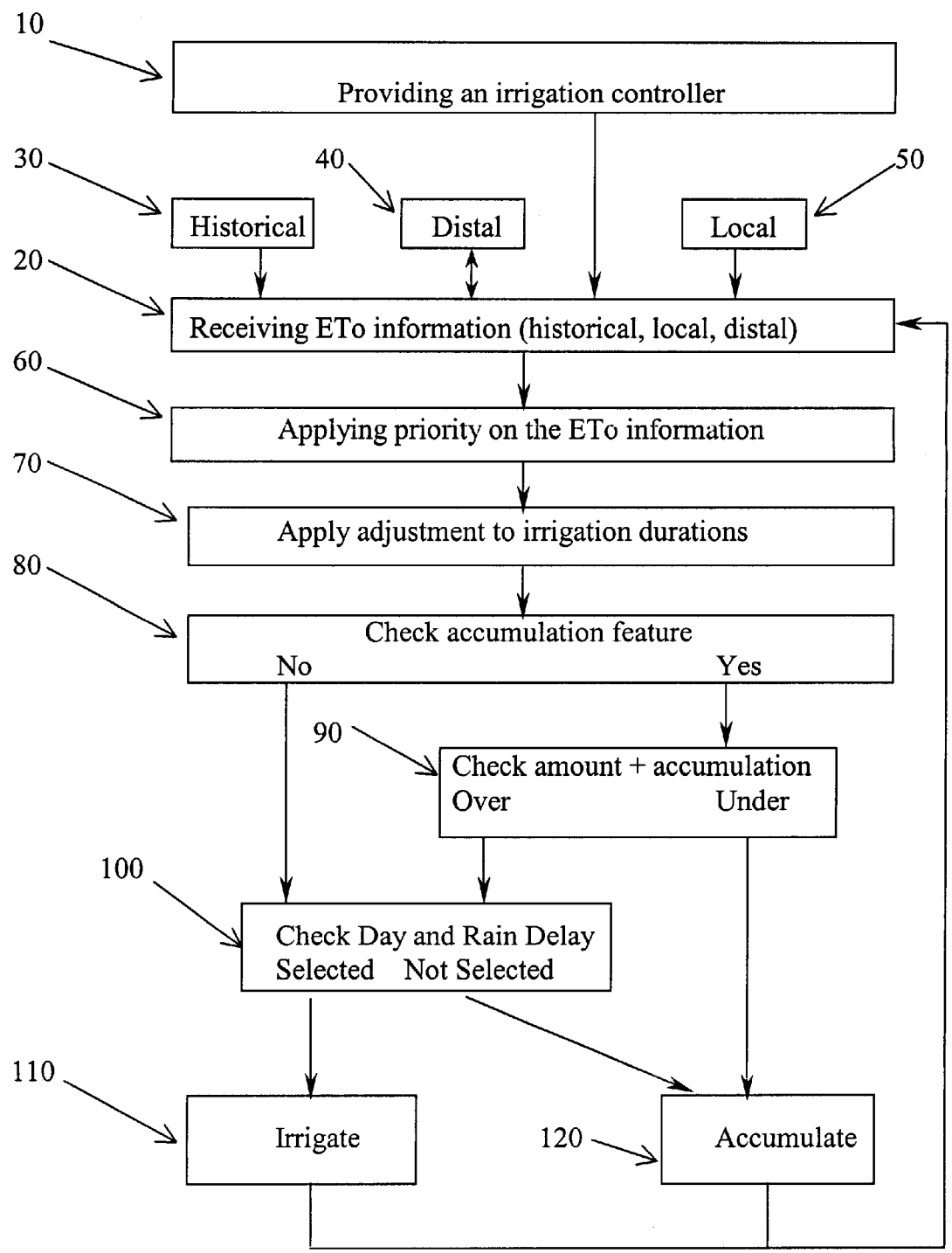
FIG. 1 is a schematic of a method embodying a controller according to the present invention.

Referring first to FIG. 1, a method of controlling irrigation to an irrigated area generally comprises the following steps: Providing an irrigation controller 10 which controls at least one irrigation control valve; and receiving ETo information from at least one of the following sources: Historical 30; Distal 40; and Local 50.

Figure 2:
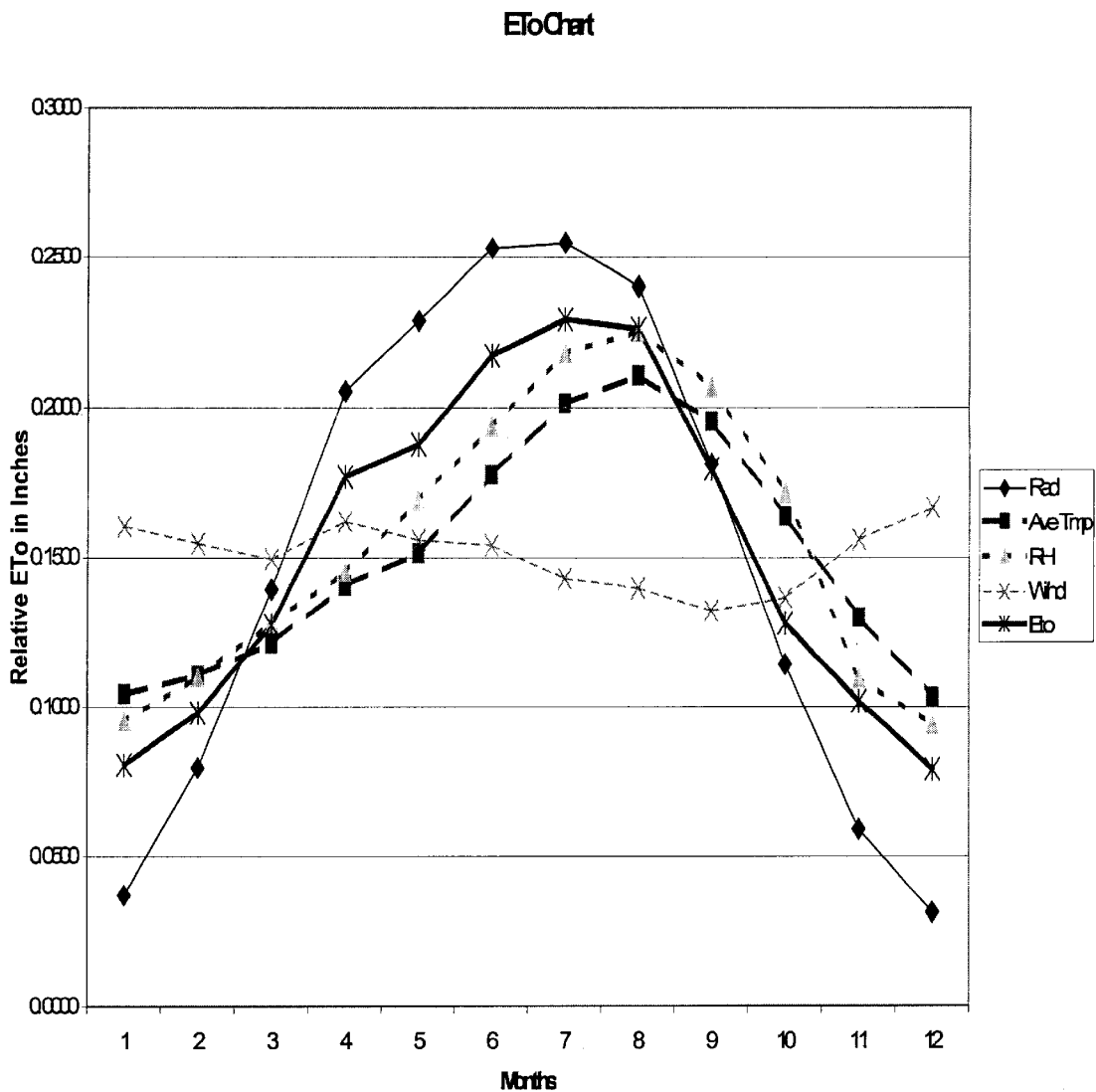
FIG. 2 is graph representing historical ETo values for a geographic area that has been collected over a twelve month period.

Historical source 30 represents data that has been collected from the geographical region over a period of time. An example of such data can be seen in FIG. 2. This graph depicts typical ETo for each month of an average year and the average temperature for each months of the year. These historic figures are used to determine the amount of irrigation that needs to be applied to match the ETo.

Distal source 40 is a modem or other data transmission connection that is capable of receiving the ETo from a source external from the controller. This source can be unidirectional where it receives just the ETo, or bi-directional where it can receive the ETo and can transmit the irrigation usage from the previous day or days.

Local source 50 is a sensor that is directly connected to the controller. This sensor can be any type that can provide feedback on environmental condition(s). The controller uses this information to determine the ETo.

Figure 3:
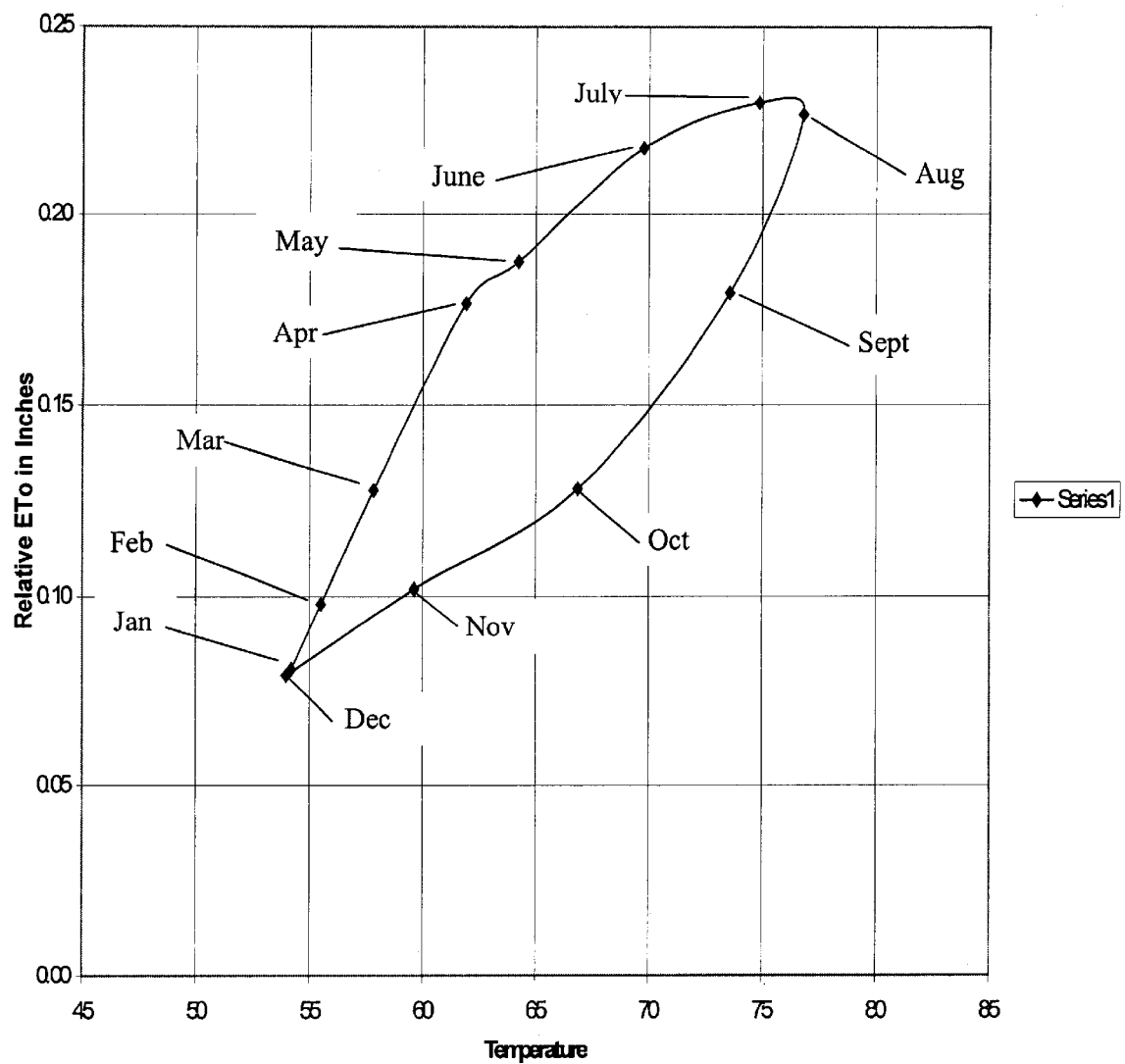
FIG. 3 is graph showing an exemplary relationship of ETo verses temperature.

FIG. 3 shows an exemplary relationship of temperature verses ETo over a year. This is an example of using a single temperature sensor to estimate ETo over an average year. The historical data for each specific area allows for an accurate estimation of ETo. The data is then received into the controller 20 FIG. 1 and is held till the next irrigation cycle. If the user wants the controller to end the irrigation cycle at sun rise, the controller could use an environmental sensor such as temperature to calculate when sun rise occurs, and deduct the total run time for the stations to determine the start time.

The controller then prioritizes the data. In preferred embodiments the highest priority is for the local sensor 50 information. If this information is not available then the controller uses information from the distal source 40. If neither of those sources of data is available then the controller uses stored historical ETo information 30. The historical ETo data can also be found in FIG. 2. Once the priority is placed on the data the value is passed to the adjustment function 70.

Adjustment function 70 involves receipt of an adjustment from the user. The content of such data may vary considerably to include whatever may be helpful in establishing an appropriate irrigation protocol. Thus, for example, the adjustment data may include raw data such as temperature, wind, solar radiation, and humidity. Additionally or alternatively the adjustment may include calculated data such as an estimated evapo-transpiration rate. It is considered extremely advantageous, but not necessary, for the adjustment to include some sort of geographic locator, so that it may extract data which is relatively specific to its particular local. The ETo rate may be calculated as a function of many different parameters, including temperature, solar radiation, humidity and wind, and preferred formulas for such calculations are set forth in various publications, including Pair, Claude H., Hinz, Walter W. Reid, Crawfors, and Frost, Kenneth R., *Sprinkler Irrigation*, (Irrigation Association, 1975).

It is contemplated that a preliminary irrigation schedule for the controller in step 10 be established using only very limited information. Thus, for example, a typical homeowner may install a controller as described herein by connecting wires from the controller to a plurality of valve control units, which in turn operate sprinklers in various zones throughout his yard. The homeowner may then use the keypad on the controller to input various codes, such as a geographic locator code. The geographic locator code can be selected from preset geographic areas, zip code, telephone area code, longitude and latitude, or other identifier. In less preferred embodiments, the preliminary irrigation schedule may even be set by default, so that no input codes are required.

In establishing a preliminary irrigation schedule, the controller would preferably combine whatever geographic locator or other information available with data from the external signal. This information would then be used to produce the calculated run times for each zone. Some zones may even have multiple on/off times, so that a high runoff zone may not be irrigated for more than 2 or 3 minutes at a time.

The calculated run times are then available to operate the valves. In preferred embodiments a configuration feature allows the controller to either irrigate or accumulate the irrigation to ensure deep irrigation for step 80. Thus, for example, in step 90 if the accumulation of irrigation is sufficiently small that the controller would only irrigate for a minute or less, the controller could accumulate the small interval of irrigation run time by adding it to the next day's expected irrigation run time. This process can continue until sufficient irrigation is accumulated to irrigate for an ideal, or at least a desirable period of time. As another example, the controller may advantageously irrigate every day, while in the winter the controller may irrigate only every fourth day. For the days between the hottest and coolest days, the accumulated run times may follow a proportional ratio to allow for correct accumulation.

Once sufficient irrigation time accumulates, the controller can check in step 100 whether or not the day is suitable to irrigate. Possible conditions that would render irrigation unsuitable include a day preference. For example, a user may not want the controller to irrigate on days that the lawn is scheduled to be mowed. Also, for example, a user may live in an area where irrigation is restricted by ordinance to even or odd days. Another possible reason for accumulating expected irrigation run time may be the presence of rain, that the user selected the controller to delay one or more days due to pending rain, or for some other event that was occurring. In such cases the expected irrigation amount can be accumulated for the next irrigation cycle step 120.

In step 100, when the listed appropriate conditions are satisfied, the controller will irrigate the zone(s) based upon the programming entered, for the duration accumulated. The actual irrigation amount data can then be saved back into the controller and/or sent to the distal source identified as step 40.

Figure 4:
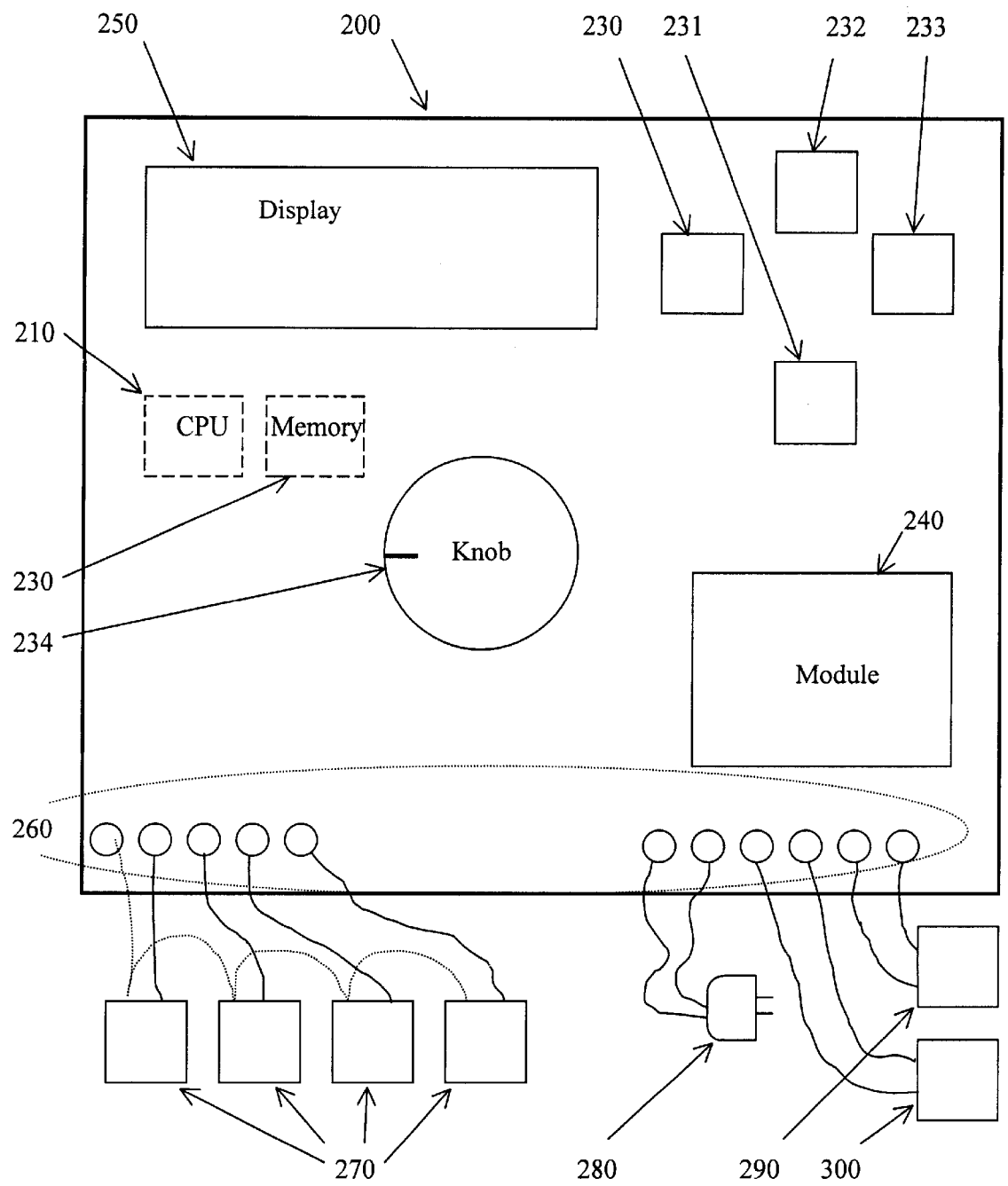
FIG. 4 is a schematic of an irrigation controller according to the present invention.

Turning to FIG. 4, an irrigation controller 200 according to the present invention generally includes a microprocessor based central processing unit 210, an on-board memory 220, some manual input devices 230–234 (buttons and or knobs), a signal receiving device 240, a display screen 250, a plurality of electrical connectors 260 for connecting with solenoids 270, and a power supply 280. Each of these components by itself is well known in the electronic industry, with the exception of the programming of the microprocessor in accordance with the functionality set forth herein. There are hundreds of suitable chips that can be used for this purpose. At the present, experimental versions have been made using a generic 87C54 chip, and it is contemplated that such chip would be satisfactory for production models.

It is also contemplated that sensors 290, 300 can be employed to provide local input parameters to assist in determining the irrigation schedule(s). In one possible embodiment, a flow meter 290, can be used to determine if a break in a sprinkler line has occurred, a malfunction of a valve, or other occurrence leading to insufficient irrigation. This information can be shown as an error message on the display or can be sent to a distal location so a repair service can be dispatched.

It is also contemplated to include one or more overrides on the controller. For example, there may be a master override that prevents irrigation in one or more zones. Such an override may be useful during maintenance or malfunction. Another override may be available for selecting a subset of days which are appropriate for irrigation, or to preclude irrigation on certain days. Such an override may be useful for preventing irrigation on days that grass is to be cut, or on days that games are to be played on the lawn. On these override days, the irrigation that would normally have been applied would be accumulated, and applied when the override had ended.

In yet another aspect of preferred embodiments the controller can have one or more common communication internal bus(es). The bus can use a common or custom protocol to communicate between devices. There are several suitable communication protocols, which can be used for this purpose. At present, experimental versions have been made using an I$^2$C serial data communication, and it is contemplated that this communication method would be satisfactory for production models. This bus is used for internal data transfer to and from the EEPROM memory, and is used for communication with other peripheral devices and measurement equipment including but not limited to temperature, modem, wind direction and speed, solar radiation, wireless remote devices, and controlling valves. The EEPROM memory can also used to store date information that, in the event of total power loss of both the primary wall power and the secondary battery power, to will provide some level of accurate historic ETo. The data bus can be disposed internally or externally relative to the controller housing. It may advantageously carry environmental information, may contain a memory device, and may have a wireless connection.

In still another embodiment the controller can account for the extra evapo-transpiration that occurs following irrigation. Published studies have shown that ETo is about 16% greater on any day that irrigation has been applied to a lawn, and on the day after irrigation about an additional 5% of ETo can be expected when compared with no irrigation being applied. The controller can add the additional ETo for such days to the calculations to provide a more accurate replacement of irrigation to each zone.

In still another embodiment it is contemplated that the controller may have a connection to run a pump. An owner may use the pump line to operate the pump, or he may use the line to control an additional valve. Since the pump line is separate from the valve line(s), it can be operated at the same time the valves are in operation. This is useful in many circumstances, as for example where the owner wants to run a drip line that runs once a week for several hours.

Thus, specific embodiments and applications of methods of controlling irrigation have been disclosed. It should be apparent, however, to those skilled in the art that many more modifications besides those described are possible without departing from the inventive concepts herein. For example, the accumulation feature might be changed from an on-off setting to a percentage that was adjustable by the homeowner. Similarly, it is possible to utilize various types of user input controls, or displays such as sliders, encoders, touch screens, switches, LED's, speech/voice, or similar devices, which affects the irrigation accumulation or other parameter such as days, frequency or duration. The inventive subject matter, therefore, is not to be restricted except in the spirit of the appended claims.

What is claimed is:

1. A method of operating an irrigation controller comprising:

providing the controller with a preliminary irrigation schedule having a run time;

determining a deep irrigation threshold amount for an irrigation zone;

determining an expected irrigation amount for a given period for the irrigation zone;

accumulating the expected irrigation amount into an accumulation irrigation amount for the irrigation zone; and when the accumulation irrigation amount is greater than or equal to the deep irrigation threshold amount, automatically modifying the preliminary irrigation schedule to water the irrigation zone by the accumulation irrigation amount.

2. The irrigation controller of claim 1 wherein the step of estimating comprises utilizing environmental information to determine an irrigation schedule for the zone.

3. The irrigation controller of claim 1 wherein the step of estimating comprises utilizing historical environmental information to determine an irrigation schedule for the zone.

4. The irrigation controller of claim 1 wherein the step of estimating comprises utilizing an at least one environmental factor selected from the group consisting of temperature, solar radiation, wind, and humidity.

5. The irrigation controller of claim 1 wherein the step of estimating comprises utilizing information received from a distal source.

6. The irrigation controller of claim 1 wherein the step of estimating adjusts for previous irrigation schedules.

7. The irrigation controller of claim 1 wherein the step of estimating comprises utilizing regional or geographic regional information.

8. The irrigation controller of claim 1 wherein the controller utilizes environmental information to adjust for date, or time of day, or season should a total loss of power occur.

9. An irrigation controller of claim 1 wherein the controller provides feedback on irrigation applied.

10. The irrigation controller of claim 9 wherein the feedback includes a valve run duration.

11. The irrigation controller of claim 9 wherein the feedback includes the actual irrigation amount.

12. The irrigation controller of claim 1 wherein the step of estimating includes utilizing data received from a data bus.

13. The irrigation controller of claim 12 further comprising a controller housing that houses the data bus.

14. The irrigation controller of claim 12 where the data bus is external to a controller housing.

15. The irrigation controller of claim 12 where the data bus carries environmental information.

16. The irrigation controller of claim 12 where the data bus contains a memory device.

17. The irrigation controller of claim 12 where the data bus has a wireless connection.

18. The irrigation controller of claim 1, wherein the controller operates a pump that provides at least some water used in irrigating the irrigation zone.

* * * * *